United States Patent
Amiri et al.

(10) Patent No.: US 9,635,649 B1
(45) Date of Patent: Apr. 25, 2017

(54) METHOD AND APPARATUS FOR CHANNEL SELECTION IN A WIRELESS LOCAL AREA NETWORK

(71) Applicant: Quantenna Communications, Inc., Fremont, CA (US)

(72) Inventors: Bahador Amiri, Los Gatos, CA (US); Hossein Dehghan, Diablo, CA (US); Hui Lan, Cupertino, CA (US); Xiaoliang Yue, Suzhou (CN); Yuan Yang, San Jose, CA (US)

(73) Assignee: Quantenna Communications, Inc., Fremont, CA (US)

( * ) Notice: Subject to any disclaimer, the term of this patent is extended or adjusted under 35 U.S.C. 154(b) by 264 days.

(21) Appl. No.: 14/324,043

(22) Filed: Jul. 3, 2014

Related U.S. Application Data

(60) Provisional application No. 61/842,534, filed on Jul. 3, 2013.

(51) Int. Cl.
*H04W 72/04* (2009.01)
*H04W 24/08* (2009.01)
*H04L 12/24* (2006.01)

(52) U.S. Cl.
CPC ....... *H04W 72/0406* (2013.01); *H04W 24/08* (2013.01); *H04L 41/0896* (2013.01)

(58) Field of Classification Search
CPC .. H04W 24/00; H04W 24/08; H04L 41/0896; H04L 1/0071; H04L 5/0007; H04L 5/023; H04L 5/143; H04L 27/2657; H04L 27/2655; H04L 43/16; H04J 14/0298; H04J 3/14

See application file for complete search history.

(56) References Cited

U.S. PATENT DOCUMENTS

2011/0255620 A1* 10/2011 Jones, IV .............. H04L 5/0046 375/260
2012/0213086 A1* 8/2012 Matsuura ................. H04B 7/04 370/241

* cited by examiner

*Primary Examiner* — Charles C Jiang
*Assistant Examiner* — Oussama Roudani
(74) *Attorney, Agent, or Firm* — IP Creators; Charles C. Cary

(57) ABSTRACT

A wireless access point (WAP) including: a channel segregator and a medium access controller (MAC). The channel segregator segregates transceiver communication resources including communication bandwidth and communication chains between the communication channel and a backup channel during a complementary operational phase characterized by monitoring of the backup channel concurrently with supporting WLAN communications on the communication channel, and further configured at a conclusion of monitoring of the backup channel to re-integrate the transceiver communication resources exclusively onto a selected one of the communication channel and the backup channel during a dedicated operational phase. The MAC is coupled to the channel segregator and configured to identify for the plurality of station nodes on the WLAN, each change in transceiver communication resources between the dedicated and complementary operational phases including changes in bandwidth and communication streams.

6 Claims, 7 Drawing Sheets

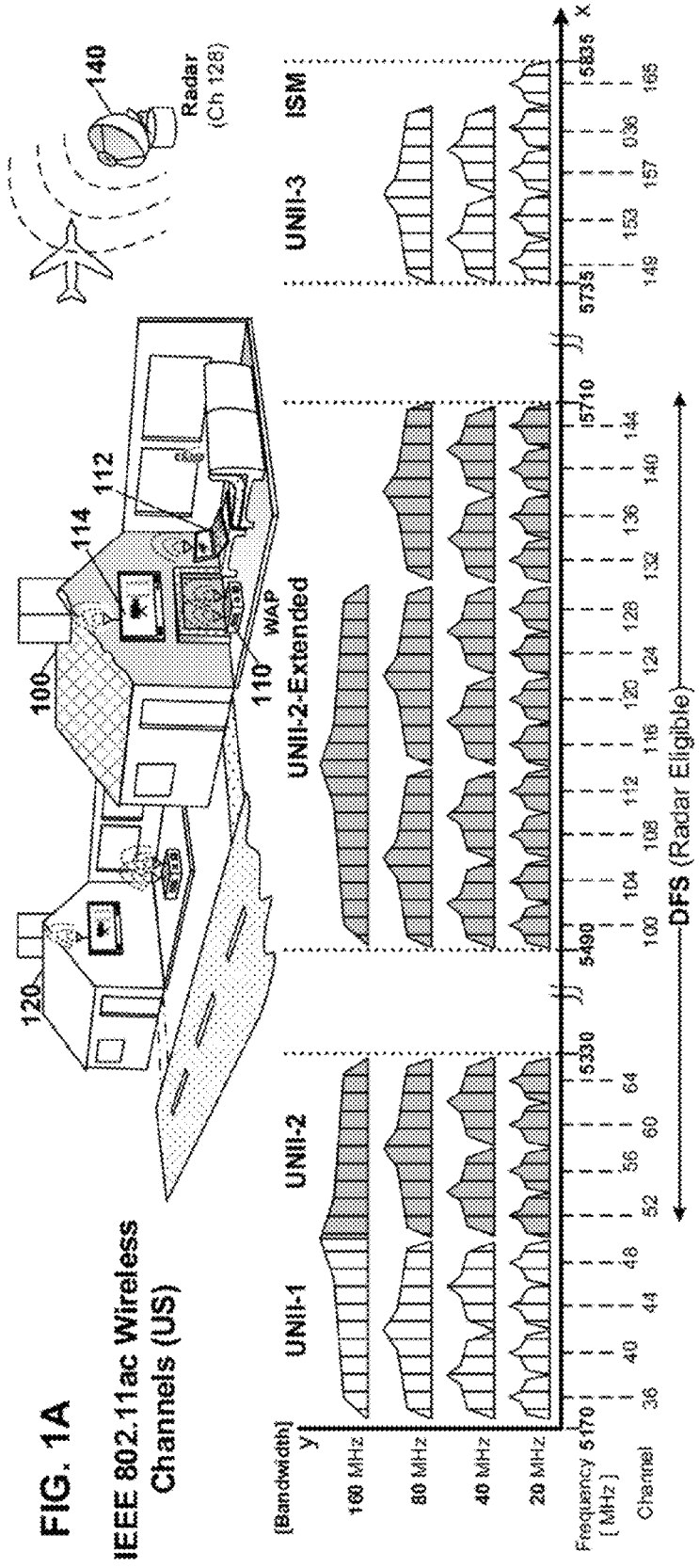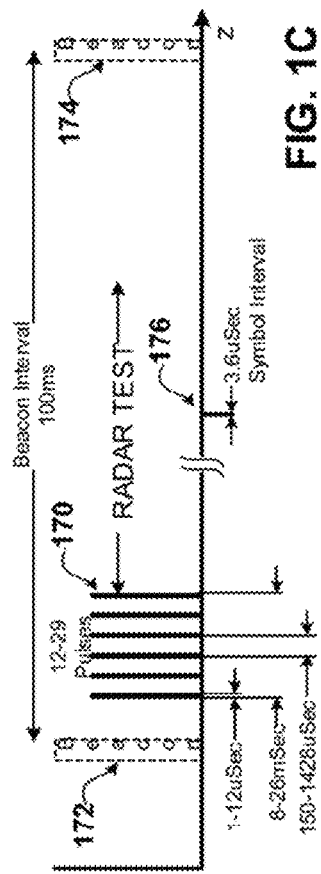
FIG. 1A
FIG. 1B
FIG. 1C

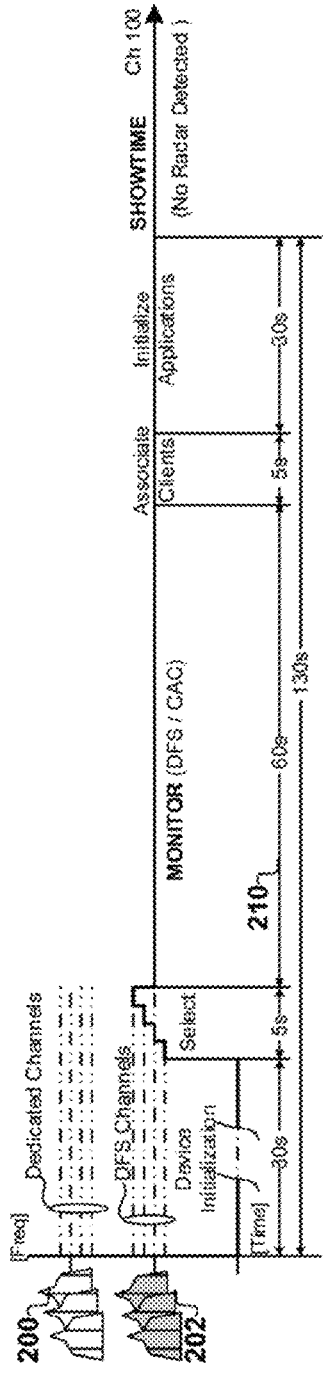
FIG. 2A    PRIOR ART: Single Channel Bootup or Channel Switch (US)
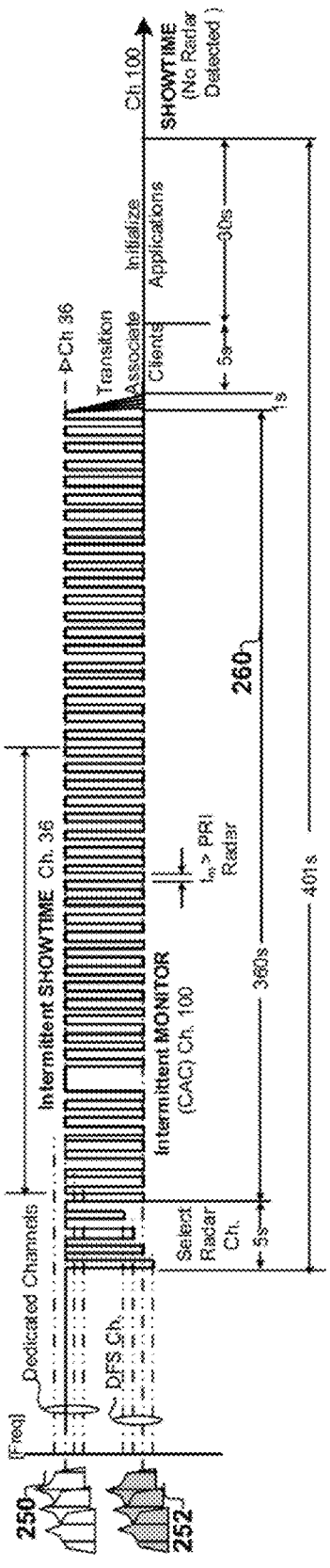
FIG. 2B    PRIOR ART: Intermittent Operation & Monitoring of 2 Channels (EP)

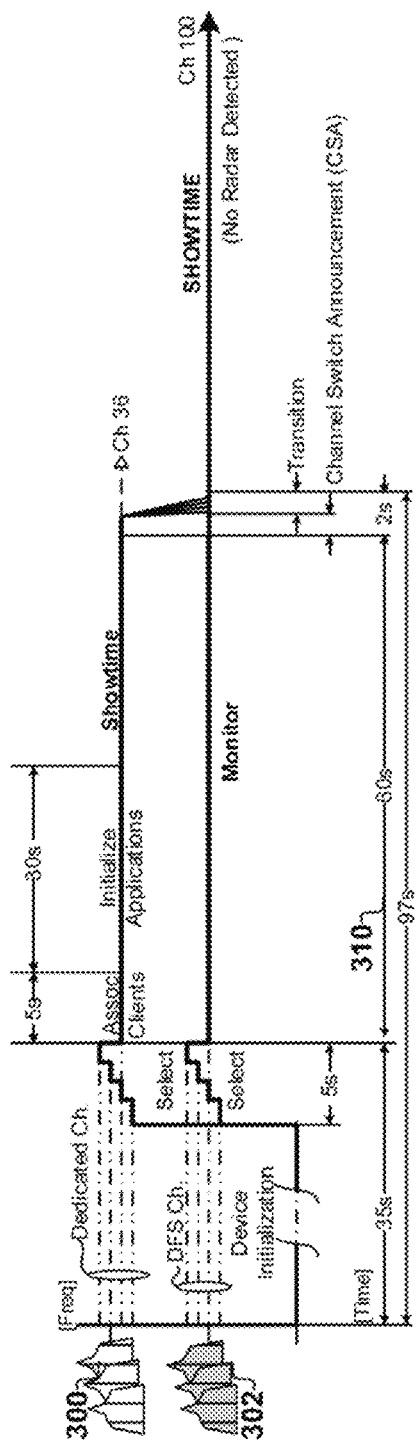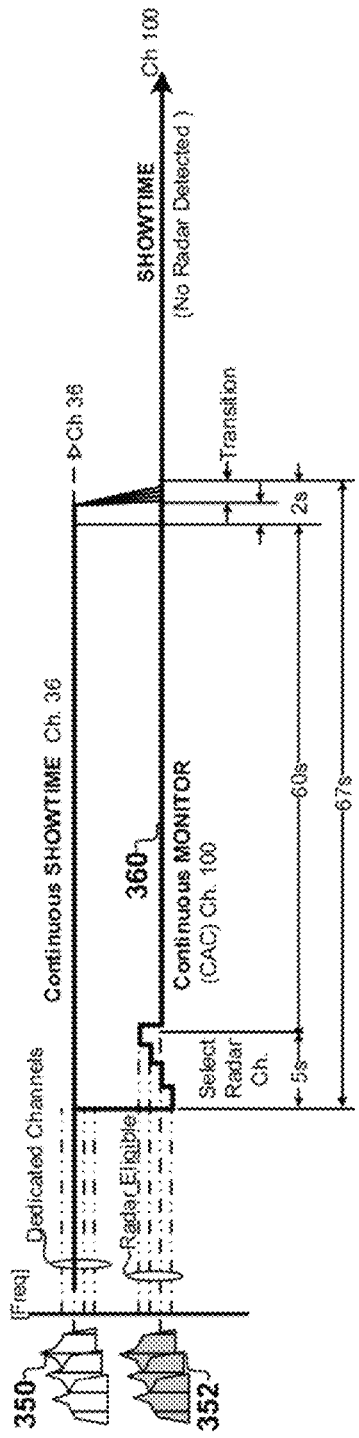
FIG. 3A  Bootup
FIG. 3B  Showtime Switchover to DFS
Continuous Operation in 1 Channel & Monitoring of other(s)

METHOD AND APPARATUS FOR CHANNEL SELECTION IN A WIRELESS LOCAL AREA NETWORK

CROSS REFERENCE TO RELATED APPLICATION

This application claims the benefit of prior filed Provisional Applications No. 61/842,534 filed on Jul. 3, 2013 entitled "Method and Apparatus for Wireless Local Area Network (WLAN) to maximize Utilization of Radar Channel without Service Interruption" which is incorporated herein by reference in its entirety as if fully set forth herein.

BACKGROUND OF THE INVENTION

1. Field of Invention

The field of the present invention relates in general to wireless local area networks (WLAN) including wireless access points (WAP) and methods of channel selection thereon.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, communications from a single source node to one target node at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP.

The IEEE 802.11ac standard also opened up new channel bandwidths, up to 160 MHz in a new WiFi frequency range, i.e. 5 GHz. A large portion of the designated channels in the 5 GHz range, were subject to prior use for weather, airport, and military radar of governmental and civilian entities. The IEEE 802.11ac standard codifies the ongoing and exclusionary entitlement of these entities to these portions of the 5 GHz spectrum. This preferential treatment is reflected in the IEEE 802.11ac standard which proscribes that any channel eligible for radar, e.g. Channels 52-64 and 100-144 in the US, can be used for WiFi only if the radar is not active. Thus a WAP must monitor a channel for an inordinately long time, e.g. at least 60 seconds, before initiating a WLAN. This requirement results in service interruptions or delays in setting up or re-establishing a WLAN on a radar eligible channel. Furthermore, even if the channel is found to have no active radar, the WAP must, after establishing a WLAN thereon, devote a portion of its operation to constantly monitoring the channel for the onset of active radar, and immediately shut down WLAN communications upon detection of same. This general set of protocols and workflows surrounding radar surrounding WiFi access to radar eligible channels is identified as Dynamic Frequency Selection (DFS) with the radar eligible channels identified as DFS channels.

What is needed are improved methods for managing access to radar eligible channels.

SUMMARY OF THE INVENTION

The present invention provides a method and apparatus for a wireless access point (WAP) apparatus which supports communications with IEEE 802.11 stations concurrently with monitoring of one or more backup channels, including radar eligible channels, a.k.a. Dynamic Frequency Select (DFS) channels as specified in IEEE 802.11ac standard.

In an embodiment of the invention a wireless access point (WAP) transceiver apparatus is disclosed. The WAP is configured to support wireless local area network (WLAN) communications with a plurality of station nodes on a selected communication channel including a plurality of orthogonal frequency-division multiplexed (OFDM) subcarriers. The WAP transceiver apparatus includes a channel segregator and a medium access controller (MAC). The channel segregator is configured to segregate transceiver communication resources including at least one of communication bandwidth and a number of communication chains between the communication channel and a backup channel distinct therefrom during a complementary operational phase characterized by monitoring of the backup channel concurrently with supporting WLAN communications between the WAP and the station nodes on the communication channel, and further configured at a conclusion of monitoring of the backup channel to re-integrate the transceiver communication resources exclusively onto a selected one of the communication channel and the backup channel during a dedicated operational phase. The MAC is coupled to the channel segregator and configured to identify for the plurality of station nodes on the WLAN, each change in transceiver communication resources between the dedicated and complementary operational phases including changes in at least one of the bandwidth and the number of communication streams associated with the selected communication channel.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-C are respectively an IEEE 802.11 ac bandplan showing DFS channels, a table showing representative DFS radar test signal types and a signal graph showing a representative DFS radar test signal;

FIGS. 2A-B are timing diagrams showing the WLAN delays associated with Prior Art methods of bootup into a DFS channel or intermittent monitoring of a DFS channel respectively;

FIGS. 3A-B are timing diagrams showing improvements of WLAN accessibility during either bootup or showtime operations, in accordance with an embodiment of the invention;

DETAILED DESCRIPTION OF THE EMBODIMENTS

Figure 4C:
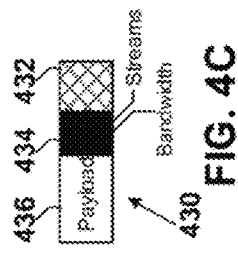
FIG. 4C shows a packet structure including preamble portion for identifying changes in number of streams and bandwidth associated with transitions between complementary and dedicated phases of operation of the invention.

The present invention provides a method and apparatus for avoiding service interruptions on a wireless local area network (WLAN) during bootup or showtime channel selection, including DFS channel selection requiring monitoring for active radar signals as a precondition to channel initialization.

FIGS. 1A-C are respectively an IEEE 802.11ac bandplan showing DFS channels, a table showing representative DFS radar test signal types and a signal graph showing a representative DFS radar test signal.

FIG. 1A shows an IEEE 802.11ac wireless bandplan superimposed on residences 100, 120 utilizing same. Residence 100 includes a wireless access point (WAP) 110 and several wireless station nodes including wireless notebook computer 112 and wireless HDTV 114. WAP 110 and station nodes 110-112 collectively form a wireless local area network (WLAN). Airport Radar 140 is shown operating in the frequency range associated with Channel 128. The graph shows frequency and channel number on the "y" axis and approved bandwidths in which the 20 Mhz channels may be aggregated on the "x" axis. The wireless bandplan shows four blocks of spectrum in the 5 GHz range.

The first spectral block is identified as UNII-1 includes channels 36, 40, 44 and 48 spanning the frequency range from 5,170 Mhz-5,250 MHz. Channels 36, 40 may be combined into a 40 Mhz channel. Channels 44, 48 may be combined into another 40 Mhz channel. Alternately, all four channels 36, 40, 44, 48 may be combined into a single 80 Mhz channel. Although other 40 Mhz or 80 Mhz channel combinations are mathematically possible, e.g. combining e.g. combining channels 40, 44, they are not supported by the standard.

The second spectral block is identified as UNII-2 includes 20 Mhz channels 52, 56, 60 and 64 spanning the frequency range from 5,250 Mhz-5,330 MHz. In the United States these channels are used by civilian, governmental, or military entities for weather radar, airport radar or military radar, which if active are given exclusive access to the channel in which they appear. The IEEE 802.11ac standard codifies this preferential treatment of radar eligible channels, by requiring extensive protracted pre and post entry radar monitoring by any WAP before and after establishing a wireless local area network (WLAN) thereon. The standard identifies these pre and post entry procedures as dynamic frequency selection (DFS) and the channels on which such procedures must be followed as DFS channels. In the graph these DFS channels are identified with a grey background. The UNII-2 bandplan also provides for bandwidth aggregation. Channels 52, 56 may be combined into a 40 Mhz channel. Channels 60, 64 may be combined into another 40 Mhz channel. Alternately, all four channels 52, 56, 60, 64 may be combined into a single 80 Mhz channel. Additionally, a single 160 MHz channel can be aggregated using all 8 20 Mhz channels 36, 40, 44, 48, 52, 56, 60, 64.

The third spectral block is identified as UNII-2-Extended and includes 20 Mhz channels 100-144 spanning the frequency range from 5,490 Mhz-5,710 MHz. In the United States these channels are eligible for radar as indicated by the shaded background and the protracted pre and post entry radar monitoring as specified by the IEEE 802.11 ac standard for DFS channels. Again, bandwidth aggregation is possible as shown in the graph.

The fourth spectral block is identified as UNII-3 and includes 20 Mhz channels 149-165 spanning the frequency range from 5,735 Mhz-5,835 Mhz. These channels are not, in the United States, DFS channels and thus do not require radar monitoring pre or post entry. Again, bandwidth aggregation is possible as shown in the graph.

FIG. 1B is a table showing representative DFS radar test signal types as used in the United States for validating WAP compliance with the IEEE 802.11ac DFS requirement. Column 150 specifies four radar types. Column 152 specifies the pulse widths ranges for each type ranging between 1-12 uSeconds. Column 154 specifies the pulse repetition interval in microseconds. Column 156 specifies the number of pulses associated with a test signal.

FIG. 1C is a signal graph showing a representative DFS radar test signal 170 in relation to WLAN beacon signals 172-174 and symbol interval 176.

FIGS. 2A-B are timing diagrams showing the WLAN delays associated with Prior Art methods of bootup into a DFS channel or intermittent monitoring of a DFS channel respectively.

FIG. 2A is a timing diagram showing a number of dedicated channels 200, i.e. channels which are not radar eligible and do not require DFS monitoring, as well as a number of DFS channels 202. FIG. 2A shows the protracted prior art approach to initializing, a.k.a. booting up, a WAP into a radar channel in the United States. After a 30 second interval for WAP initialization a DFS channel '100' is selected, and during the subsequent 60 second interval 210 monitored for radar. No WLAN activity takes place during this interval 210. Only if no radar is detected, can the client association of station nodes to the WAP take place on the DFS channel followed by initialization of the set top box or content provider's applications. Once these steps are completed the showtime phase of WLAN operation takes place characterized by transport of user data, voice or video from the WAP to the station(s) and vice versa. Similar prior art techniques are required once an operational channel has been established, to switch to a radar channel. The most onerous of these prior art DFS procedures is the interruption in WLAN service resulting from monitoring of a DFS channel. In the United States the IEEE 802.11ac standard requires that monitoring must be continuous over an uninterrupted 60 second interval 210. Thus for a prior art WAP booting directly into a DFS channel the overall delay experienced by a WLAN user is on the order of 130 seconds, with close to half of that delay caused by the DFS uninterrupted monitoring requirement. Once the WAP has a WLAN established on a particular channel, the changeover to another channel is even more odius, involving both a delay together with an interruption of service. Any prior art WAP seeking to switch an existing WLAN that is up and running, a.k.a. showtime, on one channel to a DFS channel has to, in the United States, interrupt service of an existing WLAN for 60 second monitoring interval 210 as shown in FIG. 2A. In addition to interrupting WLAN service, this period of inactivity, e.g. of no beacon signal, is long enough to risk loosing the existing WLAN connections, e.g. associations, between WAP and stations.

FIG. 2B is a timing diagram showing a number of dedicated channels 250 and a number of DFS channels 252. FIG. 2B shows another protracted prior art approach to switching a WAP from a dedicated channel, e.g. channel '36', that is up and running, a.k.a. showtime, to a DFS channel, e.g. channel '100' as practiced in Europe. The European standard allows for toggling back and forth between servicing an operational WLAN channel '36' and monitoring a DFS channel '100'. The operational channel does not have continuous uninterrupted service, rather intermittent intervals of operation on one channel followed by monitoring the other. The required span 260 of this intermittent monitoring is 6 minutes, during which sufficient time must be spent in the DFS channel to reliably detect random radar test signals of very short duration. The duration of this impairment to the operational channel is about 401 seconds, using this prior art technique.

FIGS. 3A-B are timing diagrams showing improvements of WLAN accessibility during either bootup or showtime operations, in accordance with an embodiment of the invention. The improvements result from a novel WAP with the ability to continuously service the operational channel concurrently with continuously monitoring a backup channel, e.g. a DFS channel. The WAP cuts the time to boot into a DFS channel by 25%, e.g. from 130 seconds as shown in FIG. 2A to 97 seconds as shown in FIG. 3A. The WAP cuts the time required to switch from an operational channel to a DFS backup channel by 83%, e.g. from 401 seconds as shown in FIG. 2B to 67 seconds as shown in FIG. 3B.

In FIG. 3A the timing diagram shows direct and DFS channels 300, 302 respectively. After device initialization both a dedicated channel, e.g. channel 36 and a DFS channel e.g. channel 100, are selected. Next the association and application initialization of the operational channel '36' is effected concurrently with monitoring of the selected backup channel, e.g. DFS channel 100. On the operational channel showtime operation of the WLAN begins 35 seconds after channel selection. About 25 seconds later when the monitoring of the prospective backup channel is complete and if no radar has been detected, then the WAP sends a channel switch announcement (CSA) to all associated station nodes on the WLAN of channel 36, indicating the backup channel to switch to, i.e. channel 100, and the timing of the switchover. Switching to the DFS channel is accomplished automatically and transparently without any service interruption on the WLAN.

In FIG. 3B the timing diagram shows a WLAN initially operating on channel 36 which is one of the direct channels 350 and then attempting to switch to channel 100 which is one of the DFS channels 352.

The WAP of the current invention automatically determines when the current WLAN channel is experiencing or will be experiencing a capacity constraint, and proactively seeks out a backup channel with sufficient capacity to migrate the entire WLAN to. This capacity constraint determination in an embodiment of the invention is based on criteria such as buffer length. In an alternate embodiment of the invention the capacity constraint determination may be based on criteria such instantaneous or historical: available airtime, channel throughput, available bandwidth and signal-to-noise ratio (SNR). The WAP uses these criteria to project an upcoming capacity constraint and trigger a proactive selection and monitoring of one or more backup channels.

When the WAP determines that the operational channel 36 is or will be experiencing a throughput shortfall or constraint, the WAP selects a backup channel, e.g. one of the DFS channels 352. The WAP begins a channel availability check (CAC) on the selected DFS backup channel '100'. Because the monitoring is continuous the required monitoring interval is only 60 seconds. After the 60 second monitoring interval 360 of the prospective DFS backup channel is complete and if no radar has been detected, then the WAP sends a channel switch announcement (CSA) to all associated station nodes on the WLAN of channel 36, indicating the channel to switch to, i.e. channel 100, and the timing of the switchover. Switching to the DFS channel is accomplished automatically and transparently without any service interruption on the WLAN. The WAP is also cable of bringing additional factors into consideration, besides the presence or absence of radar, in selecting the operational communication channel or the backup channel. These factors include relative: throughput capability, available airtime, channel quality of the two channels.

Figure 4A:
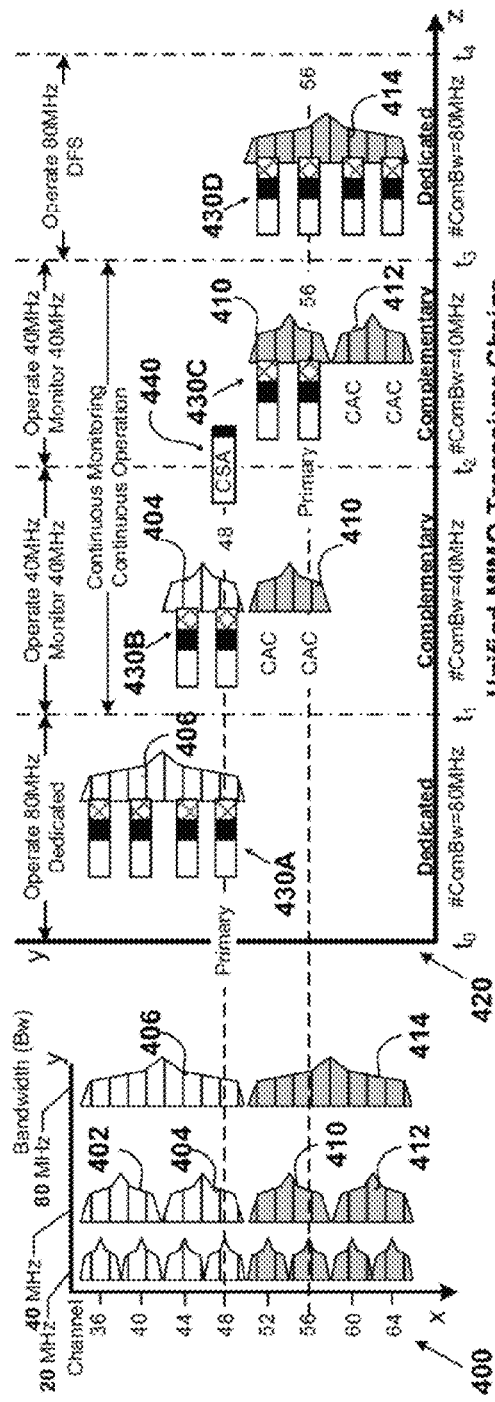
FIGS. 4A-B are graphs showing uninterrupted transitions between an operational channel and a backup channel in accordance with alternate embodiments of the invention.
Figure 4B:
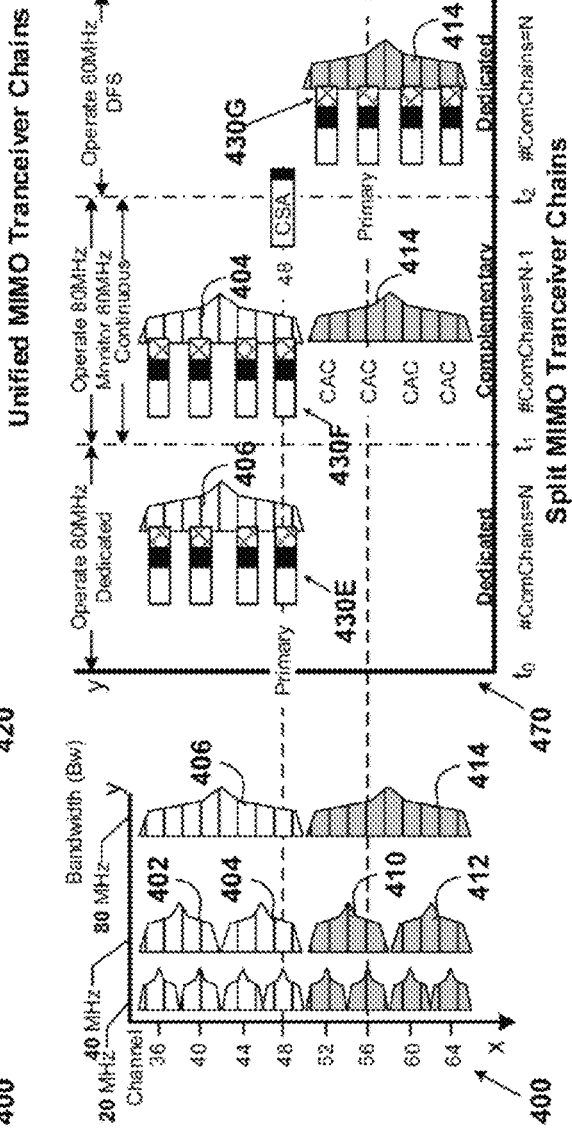

FIGS. 4A-B are graphs showing uninterrupted transitions between an operational channel and a backup channel in accordance with alternate embodiments of the invention.

FIG. 4A shows a bandplan graph 400, and a channel switching graph 420 which share a common vertical axis corresponding to a representative portion of the IEEE 802.11ac channel bandplan. In graph 400 that portion of the IEEE 802.11 ac bandplan is shown. Composite 40 MHz direct channels 402, 404 and a composite 80 Mhz direct channel 406 are shown along with the 20 Mhz base channels from which they are aggregated. Composite 40 MHz DFS channels 410, 412 and a composite 80 Mhz DFS channel 414 are shown along with the 20 Mhz base channels from which they are aggregated.

Figure 5A:
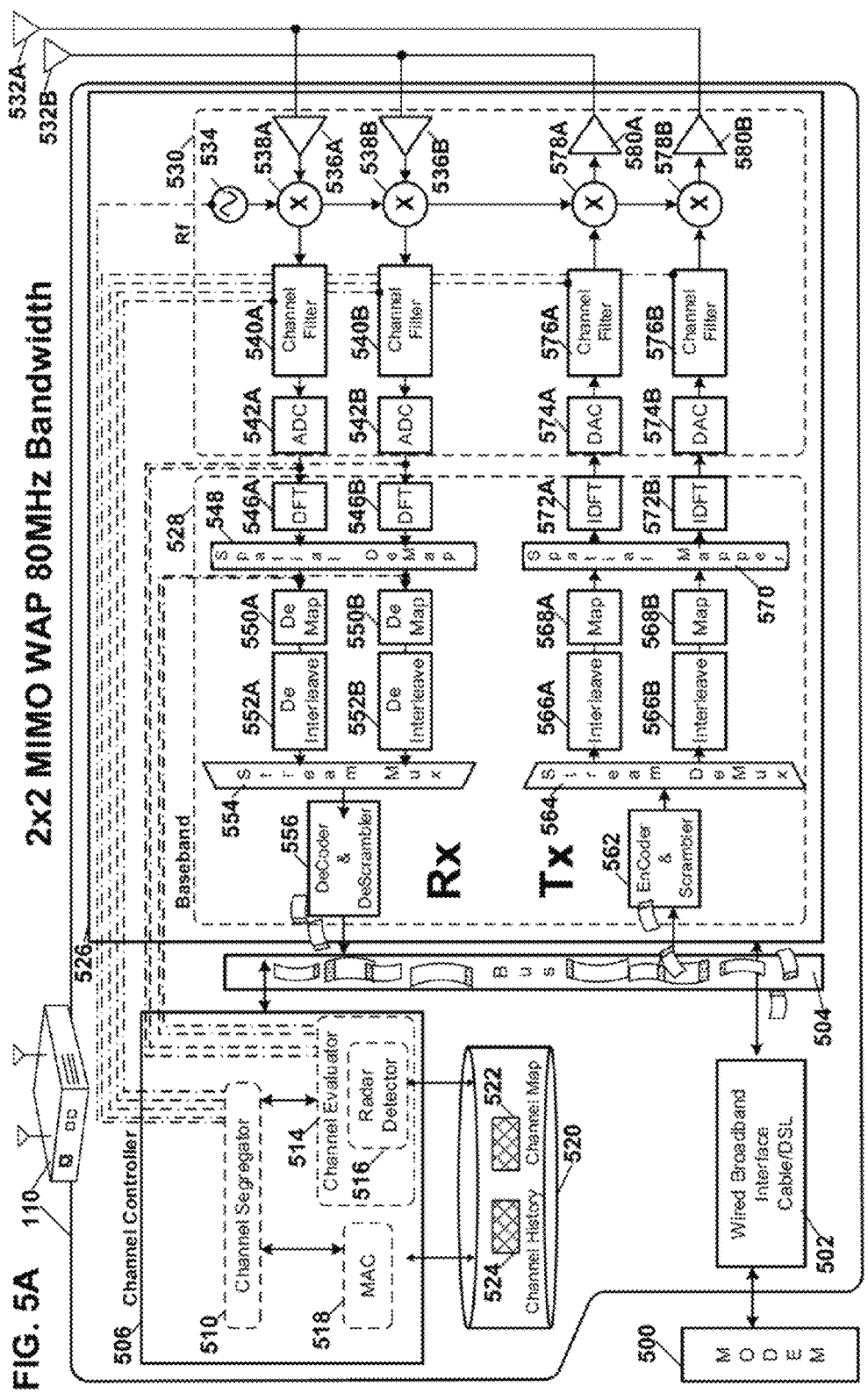
FIGS. 5-B are hardware block diagrams of a WAP having unified and split transceiver chains respectively which support uninterrupted DFS channel monitoring and switching, in accordance with alternate embodiments of the invention.

Graph 420 shows channel selections and phases of operation over time for an embodiment of the WAP shown in FIG. 5A, which has the ability to switchably segregate, during a complementary phase of operations, a portion of its total bandwidth for monitoring a backup channel, e.g. a DFS channel, with the remaining portion of its bandwidth used to support uninterrupted operations WLAN on the communication channel. At the end of monitoring the backup channel, the WAP has the capability to switchably integrate or re-integrate its total bandwidth onto a selected one of the backup channel or the communication channel for dedicated support of ongoing WLAN operations. The WAP is configured during the complementary phase of operations to implement a sliding window spanning at least three of the basic IEEE 802.11ac 20 Mhz channels, and to incrementally adjust the center frequency of the sliding window to simultaneously expose all or part of a new backup channel for monitoring at one edge of the sliding window, and discard an existing one of the operational channels of the WLAN at an opposing edge of the sliding window. WLAN operation is not interrupted because during each adjustment WLAN service is preserved/sustained on at least one of the basic 20 Mhz channels. In an embodiment of the invention, the sliding window with complementary operational and monitored channel portions, spans three or more of the basic 20 Mhz channels so that one channel can always be devoted to WLAN operations during the incremental adjustments of the center frequency during the complementary phase of operations. WLAN service is maintained by limiting the adjustments of the center frequency so as to only discard a portion of the WLAN's operational 20 Mhz channels during any one adjustment of the center frequency. When the new backup channel exposed for monitoring is a DFS channel the minimum time between adjustments is governed by the duration of the DFS monitoring interval as proscribed by the standard, e.g. 60 seconds.

Graph 420 shows three incremental adjustments of the center frequency in 40 Mhz increments of an 80 Mhz sliding window. The bandwidth of the sliding window may be all or less than all of the transceiver's maximum bandwidth. During the time interval $t_0$-$t_1$ the WAP is configured for dedicated support of the WLAN on an 80 Mhz channel 406 aggregated from four contiguous 20 Mhz basic channels 36, 40, 44, 48. In the example shown channel 48 at the leading edge of the sliding window is chosen as the primary channel. The selection of the primary channel at what will be the leading edge of the sliding window minimizes changes to the primary channel during the complementary phase of operations in the interval $t_1$-$t_3$. Packets 430A sent during the time interval $t_0$-$t_1$ contain medium access control (MAC) header portions which signal to the receiving station the bandwidth of the operational channel, i.e. 80 Mhz and the number of spatially multiplexed transceiver streams associated with WLAN operations. As the number of chains supporting the WLAN operational channel is reduced, the number of streams being less than or equal to the number of chains, may also have to be reduced.

At time $t_1$ an incremental 40 Mhz upward adjustment of the center frequency takes place from 5210 Mhz to about 5250 Mhz. This adjustment of the sliding window adds two new backup channels, i.e. DFS channels '52' and '56', for monitoring at the leading edge of the sliding 80 Mhz window and discards two of the four 20 Mhz basic channels supporting WLAN operations at the trailing edge of the sliding window. WLAN operation is maintained without interruption on a 40 Mhz channel 404 aggregated from two basic channels, i.e. channels '44' and '48' with Channel 48 continuing to serve as the primary channel. Time $t_1$ marks the onset of this complementary phase of WAP operation in which transceiver resources, e.g. bandwidth, are segregated between WLAN operation concurrently with monitoring of a backup channel(s). The WLAN packets 430B sent during the time interval $t_1$-$t_2$ contain MAC header portions which signal to the receiving stations the changed bandwidth of the operational channel, i.e. 40 Mhz and the number of spatially multiplexed transceiver streams associated therewith. During the time interval $t_1$-$t_2$ the WAP is configured for support of the WLAN on the 40 Mhz channel 404 and the monitoring of the 40 Mhz DFS channels 52, 56. The monitoring of the DFS channels, a.k.a. channel availability check (CAC) takes 60 seconds, after which in the absence of detected radar, another incremental adjustment of the center frequency takes place at time $t_2$.

At time $t_2$ another incremental 40 Mhz upward adjustment of the center frequency takes place from 5250 Mhz to about 5290 Mhz. Since the monitored DFS channels '52' and '56' do not have active radar they become the selected operational channel. To make this WLAN adjustment, a channel switch announcement (CSA) 440 is made by the WAP with the resultant changes of the WLAN operational channel to channel 410, and the selection of channel '56' as the new primary channel. This adjustment of the sliding window adds two new backup channels, i.e. DFS channels '60' and '64', for monitoring at the leading edge of the sliding 80 Mhz window and discards the two direct channels, '44' and '48' formerly supporting the WLAN operations at the trailing edge of the sliding window. WLAN operation is switched to DFS channels '52' and '56'. The WAP in time interval $t_2$-$t_3$ extends the complementary phase of operation in which transceiver resources, e.g. bandwidth, are segregated between WLAN operation 40 Mhz concurrently with monitoring 40 Mhz of a backup channel(s). The WLAN packets 430C sent during the time interval $t_2$-$t_3$ contain MAC header portions which signal to the receiving stations the changed bandwidth of the operational channel, i.e. 40 Mhz and the number of spatially multiplexed transceiver streams associated therewith. During the time interval $t_2$-$t_3$ the WAP is configured for support of the WLAN on the 40 Mhz channel 410 and the monitoring of the 40 Mhz DFS channels '60', '64'. The monitoring of the DFS channels, a.k.a. CAC takes 60 seconds. In the absence of detected radar the next transition takes place at time $t_3$.

The incremental migration of the WLAN from an 80 Mhz direct channel 406 to an 80 Mhz DFS channel 414, clear of radar, is completed at time $t_3$. In the subsequent interval $t_3$-$t_4$ the WAP enters a dedicated operational phase. In this phase, WAP resources, e.g. bandwidth, is re-integrated with the WLAN receiving dedicated support on the entire available bandwidth, e.g. 80 Mhz. Channel '56' continues to serve as the primary channel. The WLAN packets 430D sent during the time interval $t_3$-$t_4$ contain MAC header portions which signal to the receiving stations the changed bandwidth of the operational channel, i.e. 80 Mhz and the number of spatially multiplexed transceiver streams associated therewith.

In the example provided in graph 420 incremental adjustments of center frequency are set forth in 40 Mhz amounts. In alternate embodiments of the invention the incremental adjustments may be made in one or any mix of 20 Mhz and 40 Mhz increments in the case of an 80 Mhz sliding window, or 20 Mhz, 40 Mhz and 80 Mhz increments in the case of a 160 Mhz sliding window without departing from the scope of the claimed invention.

FIG. 4B shows the bandplan graph 400, and a channel switching graph 470 which share a common vertical axis corresponding to a representative portion of the IEEE 802.11ac channel bandplan.

Figure 5B:
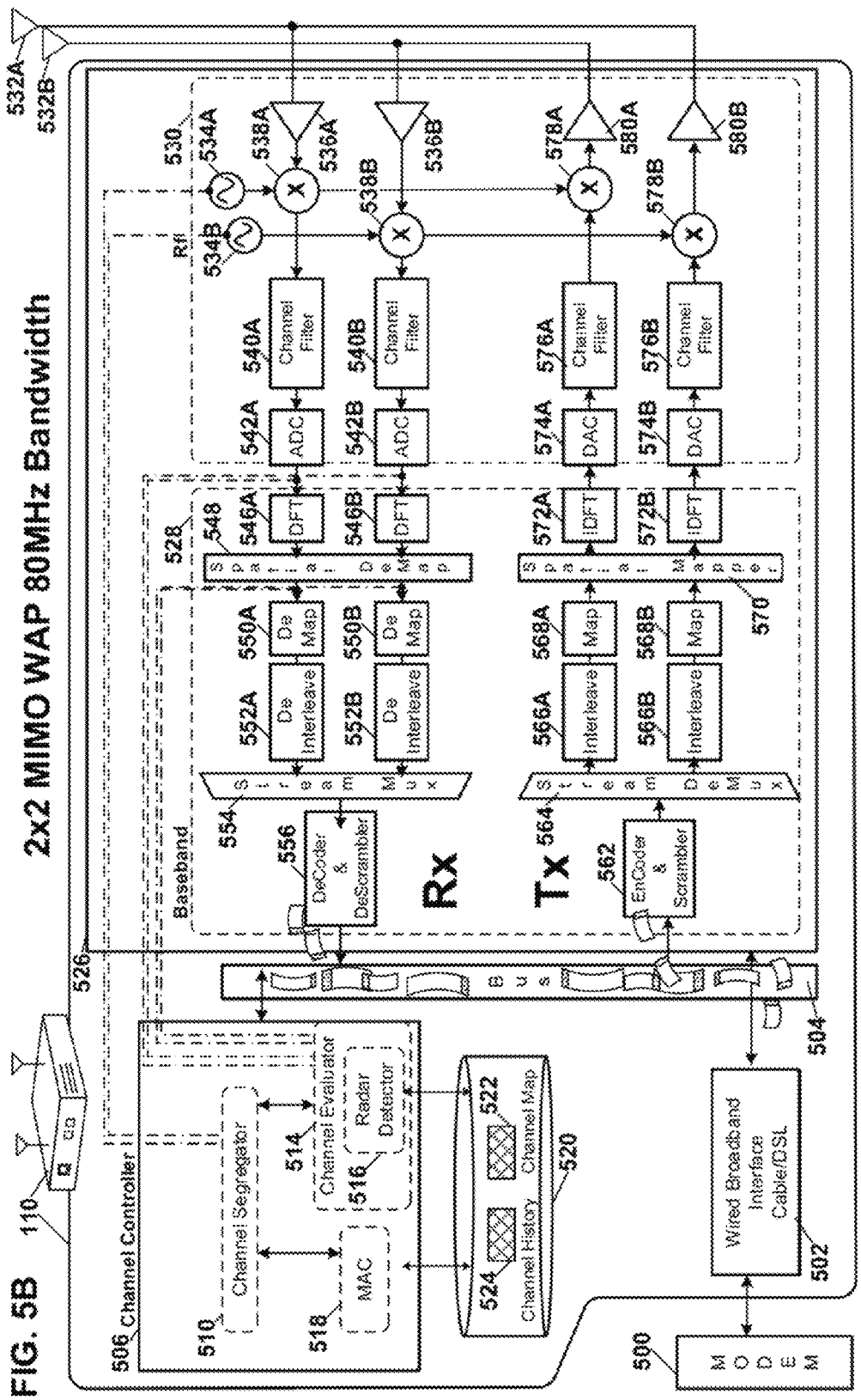

Graph 470 shows channel selections and phases of operation over time for an embodiment of the WAP shown in FIG. 5B, which has the ability to switchably segregate, during a complementary phase of operations, a portion of its total transceiver multiple-input multiple-output (MIMO) chains for monitoring a backup channel, e.g. a DFS channel, with the remaining portion of transceiver chains used to support uninterrupted operations WLAN on the communication channel. In this embodiment of the invention the operational channel and the backup channel need not be contiguous. At the end of monitoring the backup channel, the WAP has the capability to switchably integrate or re-integrate its total transceiver chains onto a selected one of the backup channel or the communication channel for dedicated support of ongoing WLAN operations. The WAP is configured during the complementary phase of operations to segregate at least one transceiver chain and associated antenna for monitoring a backup channel from remaining chains allocated to ongoing WLAN operations.

Graph 470 shows two dedicated operational phases of the WAP in which all transceiver chains are dedicated to an 80 Mhz operational channel and an intermediate complementary phase of operation in which one of the chains is segregated for monitoring backup channels. In the initial dedicated operational phase from $t_0$-$t_1$, WLAN operations are supported by all "N" transceiver chains on an 80 Mhz channel 406 aggregated from direct channels '36', '40', '44', '48'. In the final dedicated operational phase from $t_2$-$t_3$, WLAN operations are supported by all "N" transceiver chains on an 80 Mhz DFS channel 414 aggregated from direct DFS channels '52', '56', '60', '64'.

The complementary phase of WAP operation from $t_1$-$t_2$, allows for this uninterrupted migration of the WLAN to a DFS backup channel by switchably segregating, a receive portion of a MIMO transceiver chain for monitoring a prospective backup channel 414, e.g. DFS channel 414 spanning 80 Mhz bandwidth, with the remaining portion of transceiver chains, e.g. "N−1" chains, used to support uninterrupted operations WLAN on the 80 Mhz communication channel 404. If the backup channel is radar free, i.e. no radar signal is detected in the CAC interval of 60 seconds, then a channel switch announcement (CSA) is made by the WAP at time $t_2$, announcing the change of the primary channel from '48' to '56'.

Packets 430E sent during the time interval $t_0$-$t_1$ contain MAC header portions which signal to the receiving stations the bandwidth of the operational channel, i.e. 80 Mhz, and the number of spatially multiplexed MIMO transceiver streams associated with WLAN operations. Packets 430F sent during the complementary phase of operations spanning the time interval $t_1$-$t_2$ contain MAC header portions which signal to the receiving stations the bandwidth of the operational channel, i.e. 80 Mhz and the number of spatially multiplexed MIMO transceiver streams associated with WLAN operations. Since the number of streams is limited by the number of chains, a reduction in the number of chains may result in a reduction in the number of communication streams, since the number of streams is less than or equal to the number of chains. Packets 430G sent during the time interval $t_2$-$t_3$ contain MAC header portions which signal to the receiving stations the bandwidth of the operational channel, i.e. 80 Mhz and the number of spatially multiplexed MIMO transceiver streams associated with WLAN operations.

FIG. 4C shows a representative WLAN packet 430 the structure of which includes a payload portion 436 and a header including preamble 432 and information 434 portions. In the header: the preamble portion 432 has a known sequence/pattern for packet recognition and receipt timing, and an information portion 434 for identifying changes in number of streams and bandwidth associated with transitions between complementary and dedicated phases of operation of the invention. In the context of the IEEE 802.11ac standard, the information portion 434 contains the VHT-SIG-A1 and VHT-SIG-A2 portions as detailed in the standard. These portions of the header contain fields of MAC information including: number of streams and bandwidth.

FIGS. 5A-B are hardware block diagrams of WAP 110 shown in FIG. 1 and having unified and split transceiver chains respectively which support uninterrupted DFS channel monitoring and switching, in accordance with alternate embodiments of the invention.

FIG. 5A is a hardware block diagram showing a WAP with unified transceiver chains each operating on the same frequency as the others. The WAP supports uninterrupted monitoring of one channel while maintaining WLAN operations on another channel, as discussed above in connection with FIG. 4A. The WAP in this embodiment of the invention is configured to switchably segregate, during a complementary phase of operations, a portion of its total bandwidth for monitoring a backup channel, e.g. a DFS channel, with the remaining portion of its bandwidth used to support uninterrupted operations WLAN on the communication channel. At the end of monitoring the backup channel, the WAP has the capability to switchably integrate or re-integrate its total bandwidth onto a selected one of the backup channel or the communication channel for dedicated support of ongoing WLAN operations. The WAP is configured during the complementary phase of operations to implement a sliding window spanning at least three of the basic IEEE 802.11ac 20 Mhz channels, and to incrementally adjust the center frequency of the sliding window to simultaneously expose all or part of a new backup channel for monitoring at one edge of the sliding window, and discard an existing one of the operational channels of the WLAN at an opposing edge of the sliding window. The WAP is shown as supporting MIMO communications over 2 antenna each linked to two transmit and receive chains. This embodiment of the invention is however without departing from the scope of the claimed invention equally applicable to a WAP that has a single antenna and does not support MIMO communications.

The MIMO transceiver path components include antennas 532A and 532B. The antennas are coupled to radio frequency (RF) module 530 and baseband module 528 of the WLAN stage 526, which implements in an embodiment of the invention the IEEE 802.11* standard for WLAN, with the '*' standing for the particular sub-standard, e.g. a, b, g, n, ac, ad.

A first MIMO receive path originates with the antenna 532A, and includes: low noise amplifier (LNA) 536A, the tunable oscillator 534 and mixer 538A which down converts the received data channel, for filtration by the channel filter 540A, conversion in the analog-to-digital converter (ADC) 542A and domain conversion from the frequency to the time domain in the Discrete Fourier Transform (DFT) module 546A. The corresponding second MIMO receive path components are labeled with the "B" suffix.

In the baseband module 528 the complex coefficients for each sub-channel in each symbol interval are subject to spatial demapping in spatial demapper 548 followed by demapping in the associated one of demappers 550A-B. The resultant bits are deinterleaved in the associated one of deinterleavers 552A-B. Next the received data is multiplexed in stream multiplexer 554 and decoded and descrambled in the decoder and descrambler 556 which couples to the packet based bus 504.

The transmit path components in this embodiment of the invention are also shown. The data to be transmitted is encoded and scrambled in the encoder and scrambler 562. It is then demultiplexed into independent data paths one for each antenna in the stream demultiplexer 564. Next data is interleaved and mapped in the associated one of interleavers 566A-B and mappers 568A-B. Next the complex coefficients corresponding to the data are spatially mapped in the spatial mapper 570 using a selected beamforming matrix. Then the mapped coefficients of each sub-channel are transformed from the frequency domain to the time domain in the associated one of inverse discrete Fourier transform (IDFT) modules 572A-B.

Next, in the radio frequency module 530 the digital-to-analog (DAC) conversion is accomplished by the associated one of DACs 574A-B followed by filtration by the associated one of channel filters 576A-B. Next the filtered signals are upconverted in the associated one of upconverters 578A-B and amplified by the associated one of power amplifiers 580A-B each coupled to an associated one of antennas 532A-B for transmission to the receiving device. The device also includes a broadband interface 502 for interfacing with a digital signal line (DSL) or cable modem 500.

The transmit and receive paths operate under control of the channel controller 506. The transmit and receive path components coupled to antenna 532A comprise one of the two transceiver chains. The transmit and receive path components coupled to antenna 532B comprise the other of the two transceiver chains. The channel controller includes: a channel segregator 510, a medium access controller (MAC) 518, and a channel evaluator 514, all of which are coupled to storage 520.

The channel segregator in this embodiment of the invention switchably segregates, during a complementary phase of operations, a portion of its total bandwidth for monitoring a backup channel, e.g. a DFS channel, with the remaining portion of its bandwidth used to support uninterrupted operations WLAN on the communication channel. The channel segregator chooses operational and monitoring channels using a channel map 522 in storage 520. At the end of monitoring the backup channel, the channel segregator has the capability to switchably integrate or re-integrate the WAP's total bandwidth onto a selected one of the backup channel or the communication channel for dedicated support of ongoing WLAN operations. The WAP is configured during the complementary phase of operations to implement a sliding window spanning at least three of the basic IEEE 802.11ac 20 Mhz channels, and to incrementally adjust the center frequency of the sliding window via its connection to variable oscillator 534 to simultaneously expose all or part of a new backup channel for monitoring at one edge of the sliding window, and discard an existing one of the operational channels of the WLAN at an opposing edge of the sliding window. WLAN operation is not interrupted because during each adjustment WLAN service is preserved/sustained on at least one of the basic 20 Mhz channels.

The channel segregator in an embodiment of the invention couples to analog receive path filters 540A and 540B. During a complementary phase of operations one of the receive path filters is configured as a bandpass filter for handling reception of the operational channel while the other receive path filter is configured as a bandpass filter for the DFS or other backup channel to be monitored. In an embodiment of the invention where the WAP has only a single antenna and chain, the single receive path filter operates as a dual bandpass filter, filtering the operational channel for baseband processing, and the DFS or other backup channel for CAC monitoring.

The channel segregator in another embodiment of the invention couples indirectly via the channel evaluator 514, to the output of the spatial demapper 548. During a complementary phase of operations the sub-carriers, a.k.a. tones, associated with the WLAN operational channel are passed to remaining baseband components for processing, and the sub-carriers associated with monitoring of the DFS or other backup channel are monitored. In an embodiment of the invention where the WAP has only a single antenna and chain, the channel segregator couples indirectly via the channel evaluator to the output of the DFT for the complementary processing of the associated sub-carriers as discussed above.

The MAC 518 MAC couples to the channel segregator and to the packet processing components on the transmit path, e.g. the encoder and scrambler 562. The MAC is configured to identify for the plurality of station nodes on the WLAN, each change in transceiver communication resources between the dedicated and complementary operational phases including changes in at least one of the bandwidth and the number of communication streams associated with the selected communication channel. In an embodiment of the invention the MAC identifies these changes via corresponding fields in the header of each packet. In the context of the IEEE 802.11ac standard, these fields are part of the VHT-SIG-A1 and VHT-SIG-A2 as detailed in the standard.

The channel evaluator 514 includes in an embodiment of the invention a radar detector. The channel evaluator couples to the channel segregator. The channel evaluator evaluates both the operational channel and the monitored backup channel. Where DFS channels being evaluated, the channel evaluator includes a radar detector 516. The radar detector 516 in an embodiment of the invention couples to the output whichever of the ADCs 542A-B is associated with monitoring the backup channel. In another embodiment of the invention the radar detector couples to the associated sub-carrier/tone bins at the output of the spatial demapper 548. In either embodiment the radar detector monitors the channel for a radar signal itself or for energy levels associated with a radar signal. The channel evaluator selects one of the communication channel and the backup channel, with an affirmative determination as to the selection of the backup channel rather than the communication channel, based on an absence of a radar signal on the backup channel. The channel segregator is responsive to the selection of the channel evaluator to re-integrate or integrate the transceiver communication resources exclusively onto the selected one of the communication channel and the backup channel during a dedicated operational phase.

The channel evaluator is also cable of bringing additional factors into consideration in selecting the operational communication channel or the backup channel. These factors include relative: throughput capability, available airtime, channel quality of the two channels.

In another embodiment of the invention the channel evaluator projects when a shortfall or capacity constraint will occur in the WLAN's operational channel and signals the channel segregator to begin looking for a backup channel by entering the complementary operational phase. The WAP then proactively seeks out a backup channel with sufficient capacity to migrate the entire WLAN to. This capacity constraint determination in an embodiment of the invention is based on criteria such as buffer length. In an alternate embodiment of the invention the capacity constraint determination may be based on criteria such instantaneous or historical: available airtime, channel throughput, available bandwidth and signal-to-noise ratio (SNR). The WAP uses historical channel performance data 524 in storage 520 to project an upcoming capacity constraint and trigger a proactive selection and monitoring of one or more backup channels by the channel segregator.

The bandwidth segregating features of this embodiment of the invention discussed above in connection with FIG. 5A may also be supported on a WAP that does not support MIMO communications, and further that has only a single antenna, without departing from the scope of the claimed invention.

FIG. 5B is a hardware block diagram showing a WAP with split transceiver chains at least one of which is capable of operating at different or the same frequency as the other transceiver chains. The WAP supports uninterrupted monitoring of one channel while maintaining WLAN operations on another channel, as discussed above in connection with FIG. 4B. The WAP in this embodiment of the invention is configured to switchably segregate, during a complementary phase of operations, a portion of its total chains for monitoring a backup channel, e.g. a DFS channel, with the remaining portion of its transceiver chains used to support uninterrupted operations WLAN on the communication channel. In this embodiment of the invention the operational channel and the backup channel need not be contiguous. At the end of monitoring the backup channel, the WAP has the capability to switchably integrate or re-integrate all its chains onto a selected one of the backup channel or the communication channel for dedicated support of ongoing WLAN operations. The WAP is shown as supporting MIMO communications over 2 or more antenna each linked to corresponding transmit and receive chains.

The MIMO transceiver path components include antennas 532A and 532B. The antennas are coupled to radio frequency (RF) module 530 and baseband module 528 of the WLAN stage 526, which implements in an embodiment of the invention the IEEE 802.11* standard for WLAN, with the '*' standing for the particular sub-standard, e.g. a, b, g, n, ac, ad.

A first MIMO receive path originates with the antenna 532A, and includes: low noise amplifier (LNA) 536A, the tunable oscillator 534A and mixer 538A which down converts the received data channel, for filtration by the channel filter 540A, conversion in the analog-to-digital converter (ADC) 542A and domain conversion from the frequency to the time domain in the Discrete Fourier Transform (DFT) module 546A. A second MIMO receive path originates with the antenna 532B, and includes: LNA 536B, the tunable oscillator 534B and mixer 538B which down converts the received data channel, for filtration by the channel filter 5408, conversion in the ADC 542BA and domain conversion from the frequency to the time domain in the Discrete Fourier Transform (DFT) module 546B. The oscillators 534A, 534B are independently adjustable from one another under control of the channel segregator 510.

The baseband components of the receive paths are identical to those discussed above in connection with FIG. 5A.

The transmit path components in this embodiment of the invention are also shown. The baseband components of the transmit path components are identical to those discussed above in connection with FIG. 5A.

Next, in the radio frequency module 530 the DAC conversion is accomplished by the associated one of DACs 574A-B followed by filtration by the associated one of channel filters 576A-B. Next the filtered signals are upconverted in the associated one of upconverters 578A-B each of which is coupled to a corresponding one of oscillators 534A-B. The upconverted transmit paths are then amplified by the associated one of power amplifiers 580A-B each coupled to an associated one of antennas 532A-B for transmission to the receiving device. The device also includes a broadband interface 502 for interfacing with a digital signal line (DSL) or cable modem 500.

The transmit and receive paths operate under control of the channel controller 506. The transmit and receive path components coupled to antenna 532A comprise one of the two transceiver chains. The transmit and receive path components coupled to antenna 532B comprise the other of the two transceiver chains. The channel controller includes: a channel segregator 510, a medium access controller (MAC) 518, and a channel evaluator 514, all of which are coupled to storage 520.

The channel segregator in this embodiment of the invention switchably segregates, during a complementary phase of operations, a portion of its total receive chains for monitoring a backup channel, e.g. a DFS channel, with the remaining portion of its transceiver chains used to support uninterrupted operations WLAN on the communication channel. The channel segregator chooses operational and monitoring channels using a channel map 522 in storage 520. At the end of monitoring the backup channel, the channel segregator has the capability to switchably integrate or re-integrate the WAP's total transceiver chains onto a selected one of the backup channel or the communication channel for dedicated support of ongoing WLAN operations. The WAP uses the independently variable oscillators 534A-B to set the center frequencies of each receive chain to the same center frequency during the dedicated operational phase and to different center frequencies of the operational channel and the backup channel during the complementary operational phase. WLAN operation is not interrupted during the transition between complementary and direct phases of operation because the WLAN service is preserved/sustained on at least one transceiver chain.

The channel segregator in this embodiment of the invention does not require channel filters that are independently adjustable. Rather the independent oscillators 534A-B are used to select different center frequencies during the complementary phase of operation for monitoring the backup channel and for supporting the WLAN communication channel.

The MAC 518 MAC couples to the channel segregator and to the packet processing components on the transmit path, e.g. the encoder and scrambler 562. The MAC is configured to identify for the plurality of station nodes on the WLAN, each change in transceiver communication resources between the dedicated and complementary operational phases including changes in at least one of the bandwidth and the number of communication streams associated with the selected communication channel. In an embodiment of the invention the MAC identifies these changes via corresponding fields in the header of each packet. In the context of the IEEE 802.11ac standard, these fields are part of the VHT-SIG-A1 and VHT-SIG-A2 as detailed in the standard.

The channel evaluator 514 includes in an embodiment of the invention a radar detector 516. The channel evaluator couples to the channel segregator. The channel evaluator evaluates both the operational channel and the monitored backup channel. Where DFS channels being evaluated, the channel evaluator includes a radar detector 516. The radar detector 516 in an embodiment of the invention couples to the output whichever of the ADCs 542A-B is associated with monitoring the backup channel. In another embodiment of the invention the radar detector couples to the output of the spatial demapper 548 for the corresponding one of the two receive chains. In either embodiment the radar detector monitors the channel for a radar signal itself or for energy levels associated with a radar signal. The channel evaluator selects one of the communication channel and the backup channel, with an affirmative determination as to the selection of the backup channel rather than the communication channel, based on an absence of a radar signal on the backup channel. The channel segregator is responsive to the selection of the channel evaluator to re-integrate or integrate the transceiver communication resources exclusively onto the selected one of the communication channel and the backup channel during a dedicated operational phase.

The channel evaluator is also cable of bringing additional factors into consideration in selecting the operational communication channel or the backup channel. These factors include relative: throughput capability, available airtime, channel quality of the two channels.

In another embodiment of the invention the channel evaluator projects when a shortfall or capacity constraint will occur in the WLAN's operational channel and signals the channel segregator to begin looking for a backup channel by entering the complementary operational phase. The WAP then proactively seeks out a backup channel with sufficient capacity to migrate the entire WLAN to. This capacity constraint determination in an embodiment of the invention is based on criteria such as buffer length. In an alternate embodiment of the invention the capacity constraint determination may be based on criteria such instantaneous or historical: available airtime, channel throughput, available bandwidth and signal-to-noise ratio (SNR). The WAP uses historical channel performance data 524 in storage 520 to project an upcoming capacity constraint and trigger a proactive selection and monitoring of one or more backup channels by the channel segregator.

Figure 6:
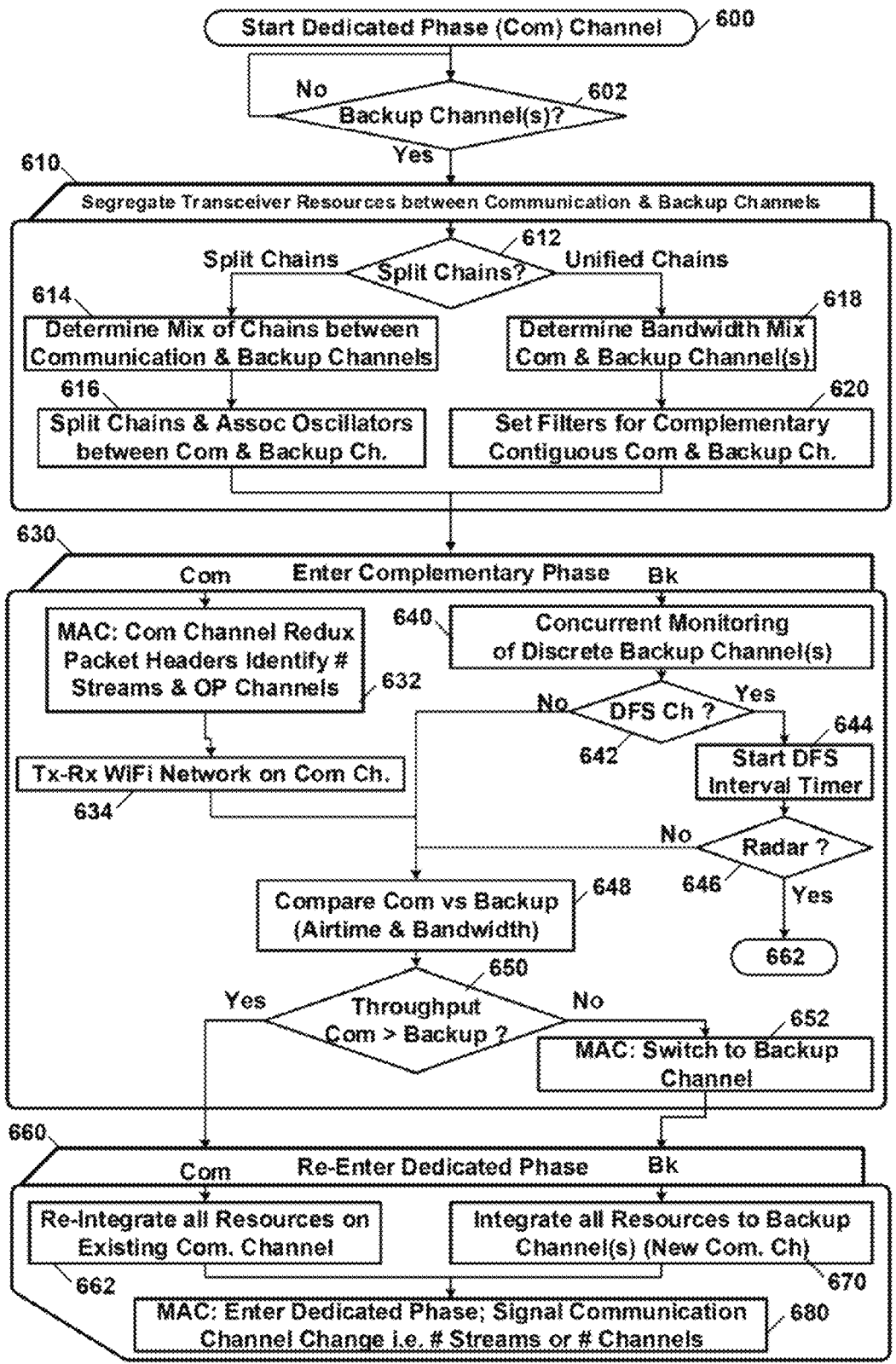
FIG. 6 is a process flow diagram of processes associated with a WAP supporting both dedicated and complementary phases of operation with the complementary phase characterized by continuous monitoring of a DFS channel concurrently with WLAN operations on a communication channel, in accordance with an embodiment of the current invention.

FIG. 6 is a process flow diagram of processes associated with a WAP supporting both dedicated and complementary phases of operation with the complementary phase characterized by continuous monitoring of a DFS channel concurrently with WLAN operations on a communication channel, in accordance with an embodiment of the current invention. Processing begins with the start or continuation of the dedicated phase of WLAN operation with all WAP resources including bandwidth and transceiver chains devoted exclusively to supporting WLAN operations on the communications channel. Next in decision process 602 a determination is made as to whether a backup channel is required. The determination as to whether to initiate monitoring of a backup channel may be based on numerous criteria including but not limited to: situational, time, and actual or projected WLAN status.

Situations which might automatically result in a decision to initiate monitoring a backup channel include WAP bootup or initialization. The WAP may, for example, be configured to automatically boot to a non-DFS channel for initial operation and immediately enter the complementary phase to monitor a prospective backup DFS channel. In another embodiment of the invention, the WAP may be configured to periodically, e.g. at midnight, enter the complementary phase and monitor a DFS or non-DFS backup channel. Alternately the decision to enter the complementary phase may be based on a current or projected shortfall or throughput constraint in WLAN operation. In this latter case, the WAP may evaluate instantaneous or historical criteria such as: buffer lengths, available airtime, channel throughput, available bandwidth and signal-to-noise ratio (SNR). Once an affirmative decision to look for a backup channel has been made control is passed to the resource segregation block of processes 620 in which transceiver resources are segregated between the WLAN communication channel and a backup channel to be monitored.

The manner in which segregation of transceiver resources takes place is determined in decision process 612. In decision process 612 a determination is made as to whether at least one of the WAP's transceiver chains can be split to operate in different frequency ranges from others or are all unified on a single selectable frequency range. If the transceiver chains are unified, or if the WAP has only a single chain then control passes to process 618. In process 618 the mix of bandwidth for ongoing support of the existing communication channel versus monitoring a backup channel is determined. Control is then passed to process 620 in which the receive path is configured to separate the complementary contiguous communication channel for processing and the backup channel for monitoring. This segregation may be implemented using the Rf filters on the receive path of each transceiver chain or may be implemented in baseband by separating the sub-carriers/tones as discussed above with respect to FIG. 5A. Control then passes to the block of complementary processes 630.

Alternately, if in decision process 612 a determination is made that at least one of the transceivers receive chains can be configured to operate in the same and different frequency ranges from the other chains then control is passed to process 614. In process 614 a determination is made as to the mix of chains between communication and backup channels. Control is then passed to process 616 in which at least one receive chain is configured to monitor the backup channel, with the other transceiver chains providing uninterrupted support for the existing communication channel. This segregation may be implemented by setting the Rf oscillator of the designated receive chain for the backup channel to the appropriate center frequency as discussed above in connection with FIG. 5B. Control then passes to the block of complementary processes 630.

There are two parallel process paths implemented by the WAP within the complementary block of processes 630. The processes associated with the operational communication channel are shown on the left side, and those associated with the backup channel are shown on the right.

In process 640 the monitoring of the backup channel is initialized. Monitoring in an embodiment of the invention involves determining the presence and amount of any competing wireless networks. Additionally, in decision process 642 a determination is made as to whether the prospective backup channel is a DFS channel requiring the proscribed procedures for checking for active radar. If the channel is a DFS channel then control passes to process 644 in which the DFS monitoring timer is set to the required DFS interval. Next in decision process 646 a determination is made as to the presence of active radar on the backup channel. If radar is detected in the monitoring interval then in decision process 646 control is passed to process 662 for re-integration of all transceiver resources on the current communication channel. Alternately, control is passed to process 648 if in decision process 642 a determination is made that the backup channel is not radar eligible, i.e. is not a DFS channel, or if in decision process 646 a determination is made that there is no active radar on the DFS backup channel being monitored.

In process 632 the WLAN stations are notified of changes in the ongoing operation of the WLAN's communication channel resulting from concurrent monitoring of a backup channel. This notification as discussed above in connection with FIGS. 4A-C and 5A-B is accomplished via MAC fields in the header of each packet with notify the stations of the reduction in resources, e.g. bandwidth and number of streams, on the operating communication channel during the complementary phase of operation. Control is then passed to process 634. In process 634 the ongoing transmission and reception of the WLAN's upstream and downstream communication packets takes place. Control then passes to process 648 in which the existing communication channel and the backup channel are compared. In an embodiment of the invention selection of the backup channel, e.g. a DFS backup channel, is based not only on the absence of radar but on other criteria as well such as available airtime, estimated throughput, channel coherence, SNR, and available bandwidth for example. In either case control is then passed to decision process 650. In decision process 650 a determination is made as to whether to select the backup channel or the existing communication channel for supporting ongoing WLAN communications. In an embodiment of the invention the criteria for the decision is the estimated throughput advantage of one channel over the other. If the decision is to stay with the existing communication channel then control passes to process 662. Alternately if the decision is to migrate to the backup channel then control passes to process 652. In process 652 the MAC notification, e.g. a channel switch announcement (CSA), is made to the stations on the existing WLAN announcing the backup channel to switch to and the timing of the transition. Control then passes to process 670.

The next block of processes are those associated with re-entering the dedicated phase of operations subsequent to the complementary phase of operations. If during the preceding complementary processing phase a decision has been made to stick with the existing communication channel then processing associated with the dedicated phase of operations begins at process block 662. In process 662 all transceiver resources are re-integrated on the existing communication channel. Alternately, if during the preceding complementary processing phase a decision has been made to switch the WLAN to the backup channel then processing begins at process block 670. In process 670 all transceiver resources are integrated on the backup channel which then becomes the new communication channel for the WLAN. In either case control passes to process 680. In process 680 MAC notifications are sent to the stations identifying any changes in resources associated with the transition from the complementary to the dedicated phase of operations. This notification as discussed above in connection with FIGS. 4A-C and 5A-B is accomplished via MAC fields in the header of each packet which notify the stations of the increase in resources, e.g. bandwidth and number of streams, on the communication channel in the dedicated phase of operations.

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless access point (WAP) transceiver apparatus supporting wireless local area network (WLAN) communications with associated station nodes on selected orthogonal frequency-division multiplexed (OFDM) communication channels; and the WAP transceiver apparatus comprising:
    at least one antenna;
    a plurality of shared and discrete components coupled to one another to form a transmit path and a receive path coupled to the at least one antenna and supporting wireless communications across a maximum transceiver bandwidth spanning more than one of the communication channels including:
    a tunable oscillator for adjusting a center frequency of the transceivers maximum bandwidth;
    a channel evaluator coupled to the receive path components to evaluate communication channels including projecting a capacity constraint on a selected communication channel supporting WLAN communications with the associated station nodes;
    a channel segregator coupled to the transmit and receive path components and responsive to the projection of a capacity constraint by channel evaluator to initiate a complementary operational phase by segregating the maximum bandwidth into an operational portion supporting ongoing WLAN communications and a monitored portion limited to monitoring a backup channel as a prospective operational communication channel, and to explore backup communications channels by incremental changes to the center frequency of the tunable oscillator during the complementary operational phase, which expose at a leading edge of a resultant sliding window spanning the maximum transceiver bandwidth previously un-monitored channels for monitoring as backup channels by the channel evaluator concurrently with discarding an existing one of the operational communication channels at a trailing edge of the sliding window and at a conclusion of the complementary phase to re-integrate in a dedicated operational phase all segregated portions of the maximum bandwidth to exclusively support operational WLAN communications on a selected one of the backup channel and the communication channel.

2. The WAP transceiver apparatus of claim 1, further comprising:
    the plurality of shared and discrete components further including:
    at least one analog-to-digital converter (ADC) on the receive path for analog-to-digital conversion of a received signal; and
    a radar detector coupled to to the at least one ADC to detect an energy level associated with a radar signal on the backup channel during the monitoring thereof in the complementary operational phase.

3. The WAP transceiver apparatus of claim 1 further comprising:
    a medium access control (MAC) which identifies for the associated station nodes, each change in transceiver communication resources between the dedicated and complementary operational phases including changes in the bandwidth of the selected communication channel between complementary and dedicated operational phases via associated information bits in a header portion of packets transmitted to the associated station nodes.

4. A method for operating a wireless access point (WAP) transceiver supporting wireless local area network (WLAN) communications with associated station nodes on selected orthogonal frequency-division multiplexed (OFDM) communication channels; and the method comprising:
    providing at least one antenna;

providing a plurality of shared and discrete components coupled to one another to form a transmit path and a receive path coupled to the at least one antenna and supporting wireless communications across a maximum transceiver bandwidth spanning more than one of the communication channels and having an adjustable center frequency;

projecting a capacity constraint on a selected communication channel supporting WLAN communications with the associated station nodes;

initiating a complementary operational phase responsive to the projecting act, including: segregating the maximum bandwidth into an operational portion supporting ongoing WLAN communications and a monitored backup channel portion;

evaluating the monitored portion of the bandwidth as a prospective operational communication channel;

incrementally adjusting the center frequency of the maximum bandwidth to expose at a leading edge of a resultant sliding window spanning the maximum transceiver bandwidth previously un-monitored backup channels for monitoring concurrently with discarding an existing one of the operational communication channels at a trailing edge of the sliding window; and re-integrating all segregated portions of the maximum bandwidth to exclusively support operational WLAN communications on a selected one of the backup channel and the communication channel during a dedicated operational phase following the complementary operational phase.

5. The method for operating a WAP transceiver of claim 4, wherein the evaluating act further comprises:

evaluating the monitored backup channel portion of the maximum transceiver bandwidth for an energy level associated with a radar signal.

6. The method for operating a WAP transceiver of claim 4, wherein the complementary operational phase further comprises:

identifying at least a reduction in the bandwidth of the operational communication channel during the complementary operational phase via associated information bits in a header portion of packets transmitted on the operational communication channel to the associated station nodes.

* * * * *